July 3, 1956
L. ALYEA
2,752,671
METHOD OF REMOVING THREADED SHAFTS
Filed Jan. 19, 1953
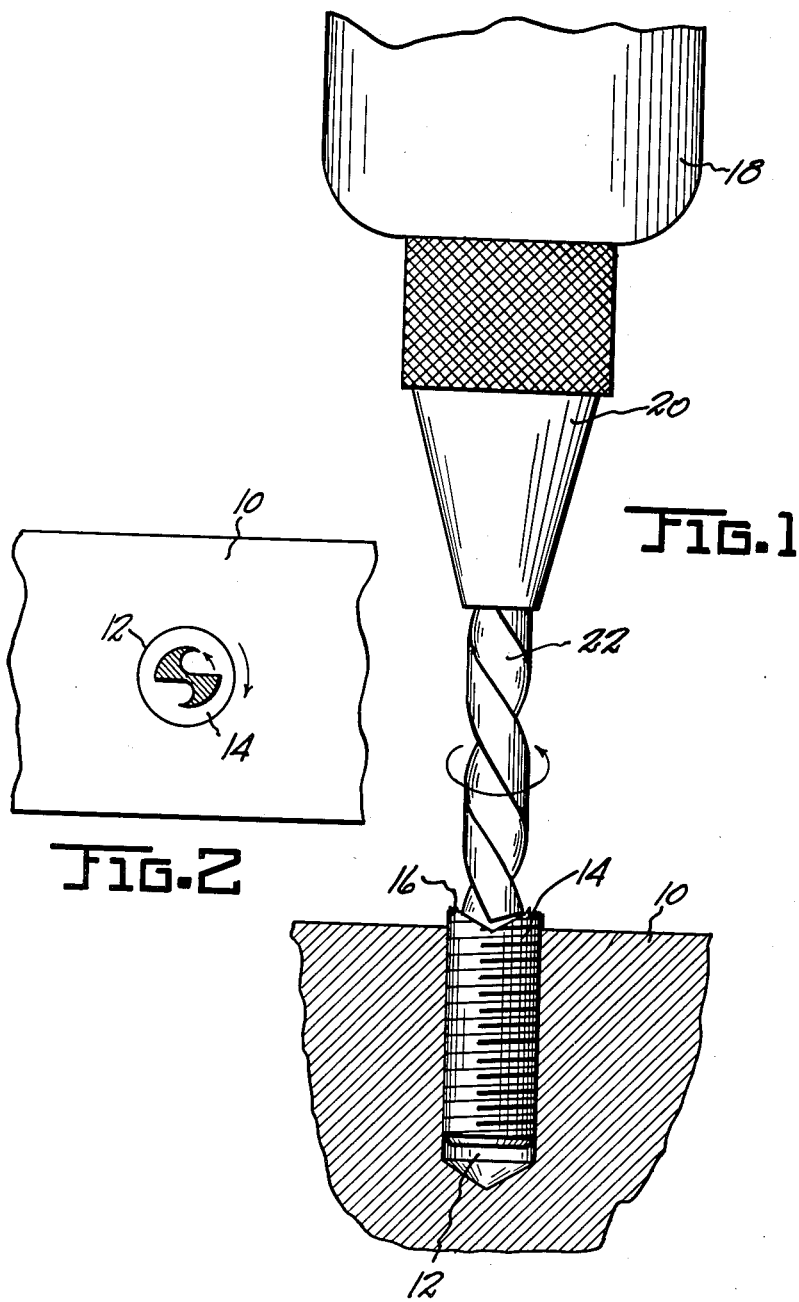
INVENTOR.
LOUIS ALYEA.
ATTORNEY

United States Patent Office 2,752,671
Patented July 3, 1956

2,752,671

METHOD OF REMOVING THREADED SHAFTS

Louis Alyea, Hebron, Ind.

Application January 19, 1953, Serial No. 331,996

3 Claims. (Cl. 29—426)

This invention relates to a method of removing threaded shafts. More particularly, it relates to a method by means of which a threaded shaft which has been broken may be removed from a machine part. Examples of such shafts are bolts and screws employed to secure machine parts together and having their heads broken or mutilated.

The operation of removing a threaded shaft, such as a bolt whose head has been broken, from a machine part when no head or other manipulating means is available for manipulating the same is costly, tedious, time-consuming and difficult. The usual method employed for this operation is first to drill the shaft and then to insert within the shaft bore a fitting, such as an expansible member, which fitting has a part projecting from it which may be gripped and manipulated by a wrench, screwdriver, or other manipulating tool. Still another method is to drill the machine parts with a drill of a diameter larger than the threaded part to be removed, so as to remove the shaft by a mechanical drilling operation, thus forming a new bore in the machine part of greater size than the shaft which was removed. Neither of these operations has been satisfactory because of expense and time consumption, and also because of the requirement for the use of special mechanisms, such as expansion fittings.

I have also observed that each of the above described customary procedures has other disadvantages. Thus, I have observed that the operation of drilling the threaded shaft for the purpose of providing a socket to receive an expansion fitting tends to drive or wedge the shaft more firmly in the machine part. Likewise, the application of expansive force by an expansion fitting tends to stress the bored shaft to more firmly seat the threaded shaft. In other words, the operation of removing a threaded shaft by means of an expansion fitting entails operations which work against the intended purpose and make it more difficult of accomplishment. The disadvantages of completely drilling an imbedded shaft to remove it include the danger of weakening the machine part and the danger of drilling into other parts fitting or encased within the part being drilled.

The primary object of this invention is to provide a novel, simple and quick method by which a screw-threaded shaft may be removed from a work piece when the usual manipulating means therefor are broken or destroyed.

A further object is to provide a method of removing a broken shaft which consists of drilling the same by means of a drill operating in the rotative direction in which the screw-threaded member must move in order to remove it from its mounting.

Other objects will be apparent from the following specification.

In the drawing:

Fig. 1 is a view illustrating the practice of my method; and

Fig. 2 is a sectional view illustrating the direction of rotation of the drill as compared to the direction of lead of the threads of the machine screw.

Referring to the drawing which illustrates the practice of my method, the numeral 10 designates a machine part or work piece having a socket or bore 12 which is internally screw-threaded and in which is received a screw-threaded shaft 14. The screw-threaded shaft 14 may be a machine screw or bolt whose head has been broken and whose exposed end surface 16 is irregular or broken, so that no means remains by which a wrench, screwdriver or other tool can exert rotative force upon the member 14 for the purpose of removing it from its socket 12.

In the practice of my method, I prefer to employ a power driven tool, preferably of the portable type having a drive motor 18 and a collet or tool-receiving chuck 20. In the chuck I mount a metal drill 22. The tool will preferably be of the reversible type capable of being operated or rotated in either of two directions under the control of suitable switch means (not shown). Alternatively, the tool will have a direction of rotation counter to the lead of the threads of the shaft 14 to be removed. Thus, if the shaft 14 has a screw-thread with a so-called right-hand lead, that is, one which causes or requires rotation of the shaft in a clockwise direction in order to advance it into a tapped bore, then the tool or motor must rotate in the opposite direction that is, must rotate counter-clockwise. Stated differently, the tool or motor must be capable of rotating in a direction similar to the direction required for removal of the shaft 14 from its tapped socket in the work piece 10. Another requirement, insofar as the drill 22 is concerned, is that it must be capable of drilling a bore when rotated by the tool in the direction above described. Thus, if a shaft 14 whose threads have a right-hand lead is to be removed, the flutes of the drill 22 will preferably have a left-hand lead, or a drill with right-hand flutes will be sharpened to effect a cutting action when rotated clockwise.

In the practice of the method, the tip of the drill 22 is applied to the exposed end 16 of the screw-threaded member 14 in a substantial centered relation with the drill being positioned with its axis substantially aligned with the axis of the screw-threaded member 14. The drill is then caused to operate by operation of the tool and while pressed against member 14 to commence a boring operation. I have found in many cases that, as the drilling operation proceeds, the frictional engagement between the tip of the drill 22 and the stud 14 becomes a driving connection which transmits to the stud 14 the rotative force of the drill 22, thereby causing the stud 14 to rotate in a releasing direction. Such driving connection usually becomes effective after the drilling operation has proceeded to an extent such that the tip of the drill has formed a starting socket in the end of the shaft 14, or to such an extent that frictional engagement exists throughout or substantially across the diameter of the drill. Thus, by a simple and quick manipulation, the shaft can be removed without in any way destroying the screw-threads upon the socket 12.

In the event that a frictional engagement of sufficient force to cause releasing rotation of the threaded shaft 14 is not produced initially then the drilling operation can continue, either until a frictional coupling or driving connection is effected as the depth of the socket formed by the drill increases, or until a socket of a depth to receive the conventional expansion fitting has been formed. In either case, it will be apparent that the operation of drilling will not have increased the wedging lock of the threads of the shaft 14 with the socket 12 of the machine piece.

Care should be exerted to position the drill 22 substantially concentrically and coaxially with the shaft 14, in order to avoid the application of any stresses to the part 14 of a character which might tend to bind it further or tighter with its work piece 10. Absolute concentricity is not required but the limit of tolerance of eccentricity is small.

While I have mentioned the use of a portable power driven tool as the preferred means for rotating the drill 22, it will be understood that the use of such a tool is illustrative and not intended to be limiting. Thus, the method can be practiced by the use of a hand-operated drill or the work piece with the imbedded broken stud can be mounted in a drill press with the drill in axial alignment with the broken stud. In every instance the important feature is the fact that an operation of drilling the broken end of the threaded stud proceeds in a direction of rotation normal to the direction in which the stud must rotate in order to be removed from the work piece.

I claim:

1. The method of removing a broken screw-threaded member from a tapped bore in a machine part, consisting of the step of pressing the tip of a drill substantially coaxially against the end of said member and partially boring said member by rotating said drill in the same direction required to withdraw said member from said bore and continuing to press said drill against said member as said member is rotated in withdrawing direction by said drill.

2. The method of removing a screw-threaded member from a tapped bore in a machine part, consisting of the step of drilling and partially boring the exposed end of the member substantially axially in a rotative direction opposite the direction of the lead of the threads of said member and maintaining substantially constant axial drilling pressure on said member as it is rotated by said drilling operation.

3. The method of removing from a tapped bore in a machine part a screw-threaded member whose threads have a lead in one direction, consisting of the step of applying to the end of said member in substantially coaxial relation the tip of a metal drill having flutes whose lead is opposite the lead of said screw-threads, and rotating said drill to partially bore said member by movement in a direction normal to its flutes and opposite the lead of said screw-threads to effect a rotation-transmitting coupling between said drill and members, and maintaining axial coupling pressure between said drill and member while said member is rotated to withdraw it from its bore.

References Cited in the file of this patent

UNITED STATES PATENTS

| | | |
|---|---|---|
| 1,458,076 | Potts | June 5, 1923 |
| 2,281,164 | Maling | Apr. 28, 1942 |
| 2,391,405 | Fuglie | Dec. 25, 1945 |
| 2,408,450 | Schrader | Oct. 1, 1946 |
| 2,547,986 | Dermark | Apr. 10, 1951 |

FOREIGN PATENTS

| | | |
|---|---|---|
| 416,628 | Germany | Aug. 1, 1925 |